(12) United States Patent
Ono et al.

(10) Patent No.: US 9,571,747 B2
(45) Date of Patent: Feb. 14, 2017

(54) ILLUMINATION APPARATUS, IMAGING APPARATUS, AND CAMERA SYSTEM

(71) Applicant: CANON KABUSHIKI KAISHA, Tokyo (JP)

(72) Inventors: Satoshi Ono, Yamato (JP); Junji Takai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/819,168

(22) Filed: Aug. 5, 2015

(65) Prior Publication Data

US 2016/0044242 A1    Feb. 11, 2016

(30) Foreign Application Priority Data

Aug. 8, 2014  (JP) .................................. 2014-163206

(51) Int. Cl.
  *H04N 5/235* (2006.01)
  *H04N 5/225* (2006.01)
  (Continued)

(52) U.S. Cl.
  CPC ............ *H04N 5/2354* (2013.01); *G03B 15/05* (2013.01); *H04N 5/2256* (2013.01);
  (Continued)

(58) Field of Classification Search
  CPC .............. H04N 5/23245; H04N 5/2256; H04N 5/23216; H04N 5/23212; H04N 5/2354; G03B 15/05; G03B 7/16; G03B 2215/0521; G03B 15/02; G03B 2215/05; G03B 41/14; G03B 9/70; G03B 15/04; G06K 2209/401; G06K 9/2027
  See application file for complete search history.

(56) References Cited

U.S. PATENT DOCUMENTS

| 4,472,042 A * | 9/1984 | Iwata ........................ G03B 7/16 396/165 |
| 5,038,165 A * | 8/1991 | Amanuma ............. G03B 17/40 396/103 |

(Continued)

FOREIGN PATENT DOCUMENTS

| JP | 63-204238 A | 8/1988 |
| JP | 04-340527 A | 11/1992 |
| JP | 2011-137960 A | 7/2011 |

*Primary Examiner* — Shahbaz Nazrul
(74) *Attorney, Agent, or Firm* — Canon USA, Inc., IP Division

(57) ABSTRACT

An illumination apparatus includes a light emitting unit, a movable unit, including the light emitting unit, that is rotatable relative to a main body unit, an obtaining unit that obtains first distance information about a distance to a target in a shooting direction of the imaging apparatus to which the illumination apparatus is attached, and second distance information about a distance to a target in a direction different from the shooting direction, a determination unit that determines, based on the first distance information and the second distance information obtained by the obtaining unit, a lighting direction of the light emitting unit, wherein the obtaining unit obtains, in a case where a self-timer mode is set in the imaging apparatus, the first distance information after a lapse of a predetermined time following obtainment of the second distance information.

14 Claims, 5 Drawing Sheets

(51) Int. Cl.
*H04N 5/232* (2006.01)
*G03B 15/05* (2006.01)
*G03B 7/16* (2014.01)

(52) U.S. Cl.
CPC ..... *H04N 5/23212* (2013.01); *H04N 5/23216* (2013.01); *H04N 5/23245* (2013.01); *G03B 7/16* (2013.01); *G03B 2215/0521* (2013.01)

(56) References Cited

U.S. PATENT DOCUMENTS

| | | | | |
|---|---|---|---|---|
| 5,134,433 A | * | 7/1992 | Takami | G03B 7/16 396/165 |
| 5,361,120 A | * | 11/1994 | Takami | G03B 7/16 396/165 |
| RE35,415 E | * | 12/1996 | Takami | G03B 7/16 396/165 |
| 6,240,252 B1 | * | 5/2001 | Yamaguchi | G02B 7/28 396/106 |
| 6,259,862 B1 | * | 7/2001 | Marino | G03B 7/16 396/106 |
| 2013/0321691 A1 | * | 12/2013 | Naito | G03B 13/36 348/345 |

* cited by examiner

ILLUMINATION APPARATUS, IMAGING APPARATUS, AND CAMERA SYSTEM

BACKGROUND

Field

Aspects of the present invention generally relate to lighting direction control in an illumination apparatus.

Description of the Related Art

In one conventional type of flash shooting, an illumination apparatus emits light toward a ceiling and the like, so that the light is reflected and diffused by the ceiling and the like, to illuminate a subject (hereinafter referred to as "bounce flash shooting"). In the bounce flash shooting, the illumination apparatus can emit light indirectly, not directly, to the subject, and therefore, an image can be obtained with gentle light.

Further, techniques for automatically determining an optimum lighting direction in the bounce flash shooting have been discussed. For example, Japanese Patent Application Laid-Open No. 04-340527 discusses a technique for automatically setting an angle of a flash emitting unit when the flash emitting unit emits a flash toward a ceiling in the bounce flash shooting. More specifically, the angle of the flash emitting unit is automatically set, based on information about a distance to an object located above a camera and about a subject distance.

Meanwhile, there is a so-called self-timer function that causes shooting to start after a lapse of a predetermined time following provision of an image shooting instruction by a photographer. However, shooting by using the self-timer function is not considered in the conventional technique discussed in Japanese Patent Application Laid-Open No. 04-340527.

SUMMARY

Aspects of the present invention are generally directed to an illumination apparatus, an imaging apparatus, and a camera system which are capable of efficiently determining a lighting direction of the illumination apparatus, when performing bounce flash shooting by automatically determining the lighting direction of the illumination apparatus, when using a self-timer function.

According to an aspect of the present invention, an illumination apparatus attachable to an imaging apparatus, the illumination apparatus includes a light emitting unit, a movable unit, including the light emitting unit, configured to be rotatable relative to a main body unit, an obtaining unit configured to obtain first distance information about a distance to a target in a shooting direction of the imaging apparatus to which the illumination apparatus is attached, and second distance information about a distance to a target in a direction different from the shooting direction, a determination unit configured to determine, based on the first distance information and the second distance information, a lighting direction of the light emitting unit, and a control unit configured to control a position of the movable unit to match a lighting direction of the light emitting unit with the lighting direction determined by the determination unit, wherein the obtaining unit obtains, in a case where a self-timer mode is set in the imaging apparatus to which the illumination apparatus is attached, the first distance information after a lapse of a predetermined time following obtainment of the second distance information.

Further features of the present disclosure will become apparent from the following description of exemplary embodiments with reference to the attached drawings.

DESCRIPTION OF THE EMBODIMENTS

Exemplary embodiments will be described in detail below with reference to the attached drawings.

Figure 1:
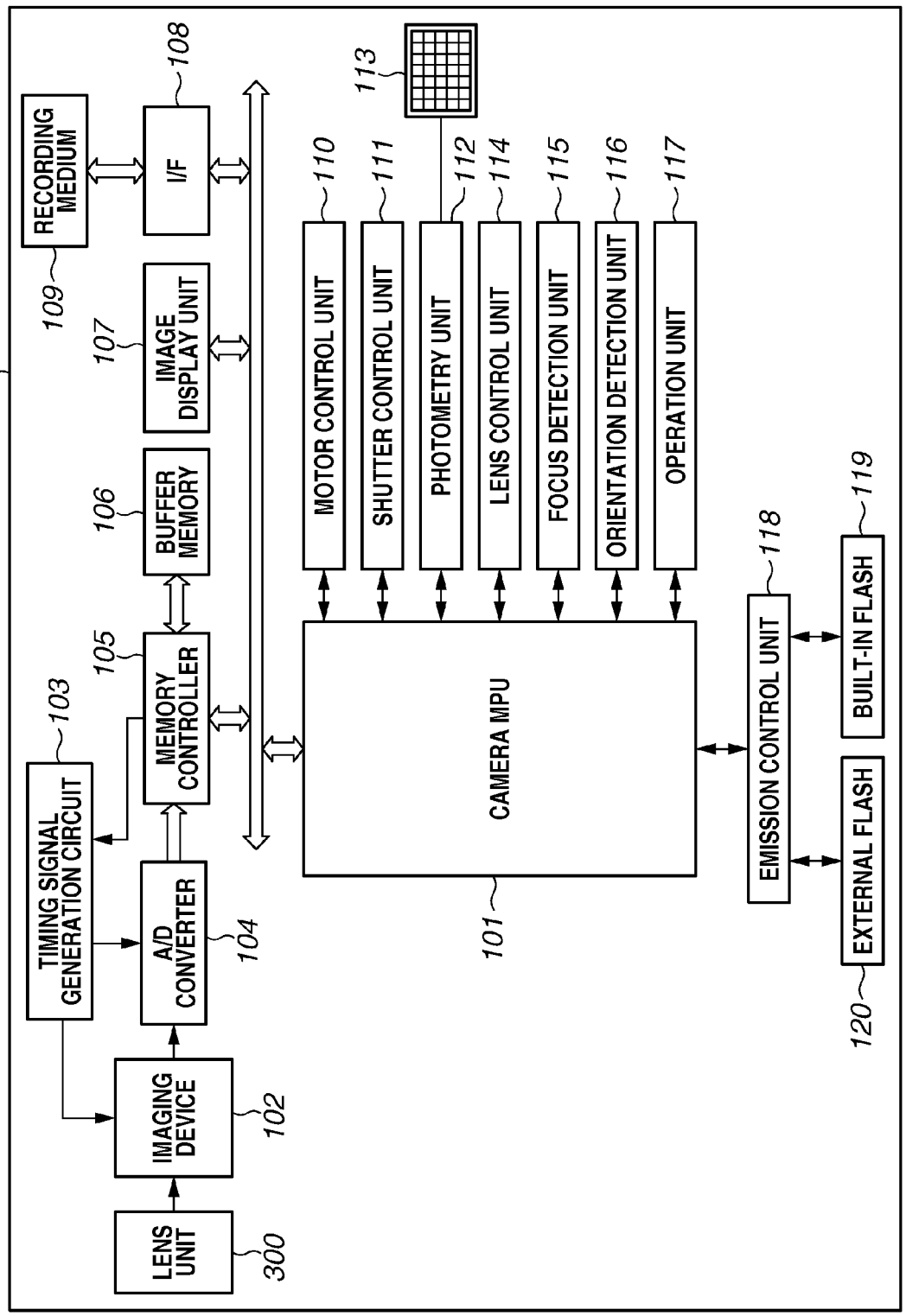
FIG. 1 is a block diagram illustrating a configuration example of an imaging apparatus according to an exemplary embodiment.

First, a configuration of a camera 100 that is an imaging apparatus according to an exemplary embodiment will be described with reference to FIG. 1. FIG. 1 is a block diagram illustrating a configuration example of the camera 100.

A camera micro processing unit (MPU) 101 is a microcontroller for controlling operations of the entire camera 100. Further, the camera MPU 101 includes a timer that measures a waiting time in a self-timer mode described below. An imaging device 102 is an imaging device employing a complementary metal oxide semiconductor (CMOS) image sensor, a charge coupled device (CCD) image sensor, or the like, and converts reflected light from a subject into an electrical signal. A timing signal generation circuit 103 generates a timing signal required to operate the imaging device 102. An analog-to-digital (A/D) converter 104 converts analog image data read from the imaging device 102, into digital image data. A memory controller 105 controls memory reading/writing, a refresh operation of a buffer memory 106, and the like. An image display unit 107 displays image data stored in the buffer memory 106. An interface 108 is provided for connection to a recording medium 109 such as a memory card and a hard disk. A motor control unit 110 moves a mirror (not illustrated) up and down to change an optical path of a light flux entering via a lens unit 300, by controlling a motor (not illustrated) according to a signal from the camera MPU 101. The light flux entering via the lens unit 300 is guided to the imaging device 102 when the mirror is up, whereas the light flux entering via the lens unit 300 is guided to a photometry sensor 113 when the mirror is down.

A shutter control unit 111 controls a shutter (not illustrated), according to a signal from the camera MPU 101. The shutter is disposed in front of the imaging device 102, to switch the state of the imaging device 102 between a light-shielding state and an exposure state.

A photometry unit 112 outputs a photometric value to the camera MPU 101, based on an output of the photometry sensor 113 divided into a plurality of areas corresponding to those in an imaging screen. The photometric value is a photometry result of each of the areas. The camera MPU 101 performs exposure calculation to determine exposure control values to be used in shooting, based on the photometric value of each of the areas. The exposure control values include an aperture value (AV), a time value (TV) representing a shutter speed, and an International Organization for Standardization (ISO) speed representing shooting sensitivity.

The camera MPU 101 also performs calculation of an amount of a light emission from a built-in flash 119 or an external flash 120 in flash shooting. This calculation is performed based on a photometric value output from the photometry unit 112 when a pre-emission is released toward a subject by the built-in flash 119 or the external flash 120.

A lens control unit 114 performs focus adjustment and aperture adjustment of the lens unit 300, by controlling a lens drive motor and an aperture drive motor (neither illustrated) according to a signal from the camera MPU 101.

A focus detection unit 115, based on an output from a focus detection sensor having a plurality of distance measurement points corresponding to those on the imaging screen, outputs a defocus amount of each of the distance measurement points to the camera MPU 101. Based on the defocus amount output from the focus detection unit 115, the camera MPU 101 instructs the lens control unit 114 to execute a focus adjustment operation.

An orientation detection unit 116 is configured of components including an acceleration sensor, and detects orientation of the camera 100 relative to a gravity direction.

An operation unit 117 includes a release button that receives an instruction for starting a shooting preparation operation and an instruction for starting a shooting operation. When a switch SW1 is turned on by a first stroke (a half press) of the release button, the camera MPU 101 starts the shooting preparation operation including a focus detection operation, a photometry operation, and the like. Further, when a switch SW2 is turned on by a second stroke (a full press) of the release button, the camera MPU 101 starts the shooting operation.

The operation unit 117 further includes an automatic bounce switch for switching between execution and non-execution of a function of automatically determining an optimum lighting direction in bounce flash shooting (hereinafter referred to as "automatic bounce").

The operation unit 117 further includes a setting button provided to set the self-timer mode for executing a self-timer function. The self-timer function is provided to start the shooting operation after waiting for a predetermined time following turning on of the switch SW2 by the second stroke (the full press) of the release button. A user can change the time to wait until the shooting operation starts in the self-timer mode, by operating various buttons of the operation unit 117.

An emission control unit 118 controls an emission pattern and an emission amount of a light emission such as a pre-emission and a main emission, according to a signal from the camera MPU 101, when using the built-in flash 119.

Further, the emission control unit 118 performs switching as to whether control according to a signal from the camera MPU 101 is applied to the built-in flash 119 or the external flash 120.

Figure 5:
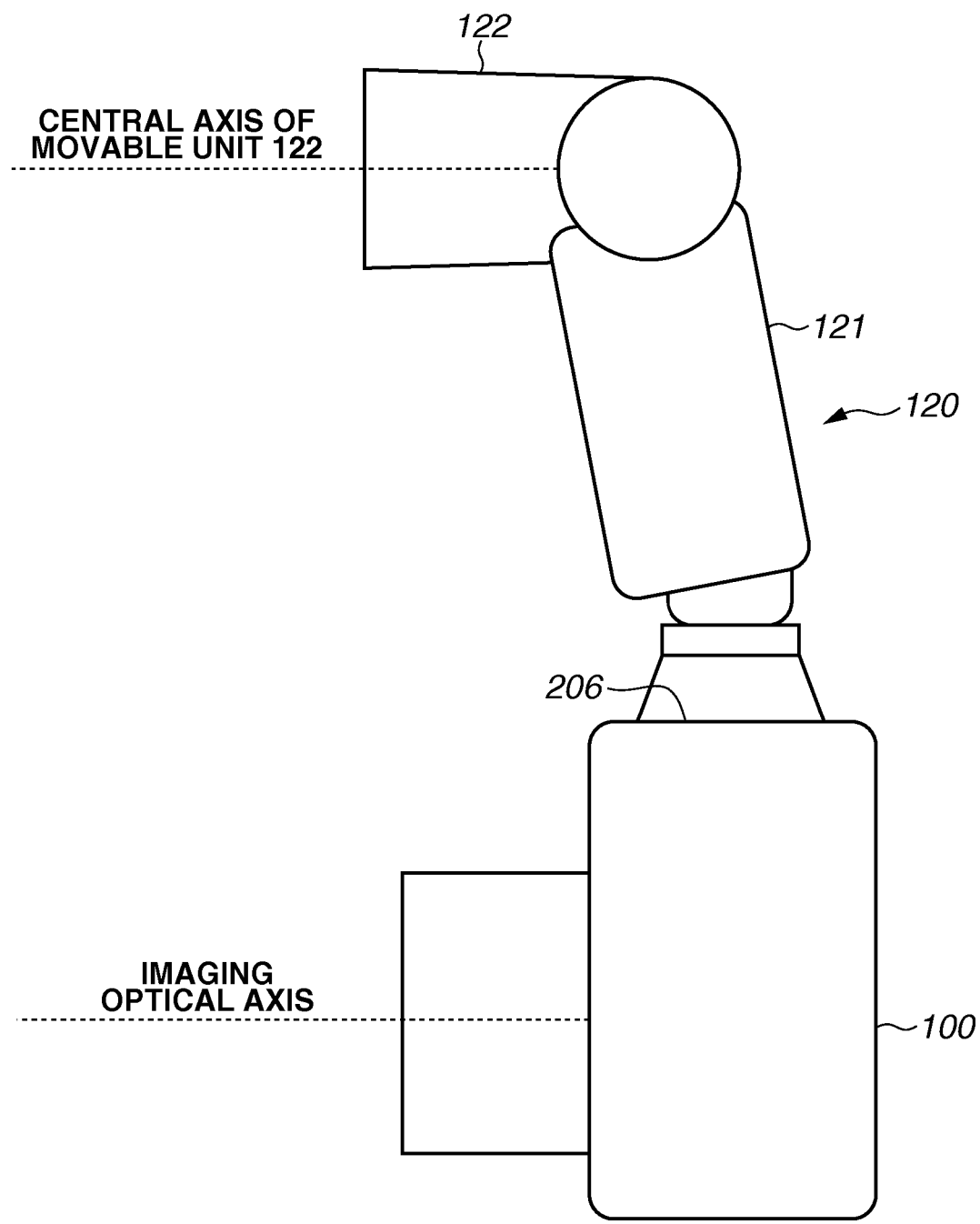
FIG. 5 is a diagram illustrating a state where the illumination apparatus is attached to the imaging apparatus according to the exemplary embodiment.

In the present exemplary embodiment, a case where the control according to a signal from the camera MPU 101 is applied to the external flash 120, in a camera system including the camera 100 and the external flash 120 as illustrated in FIG. 5, will be described.

Figure 2:
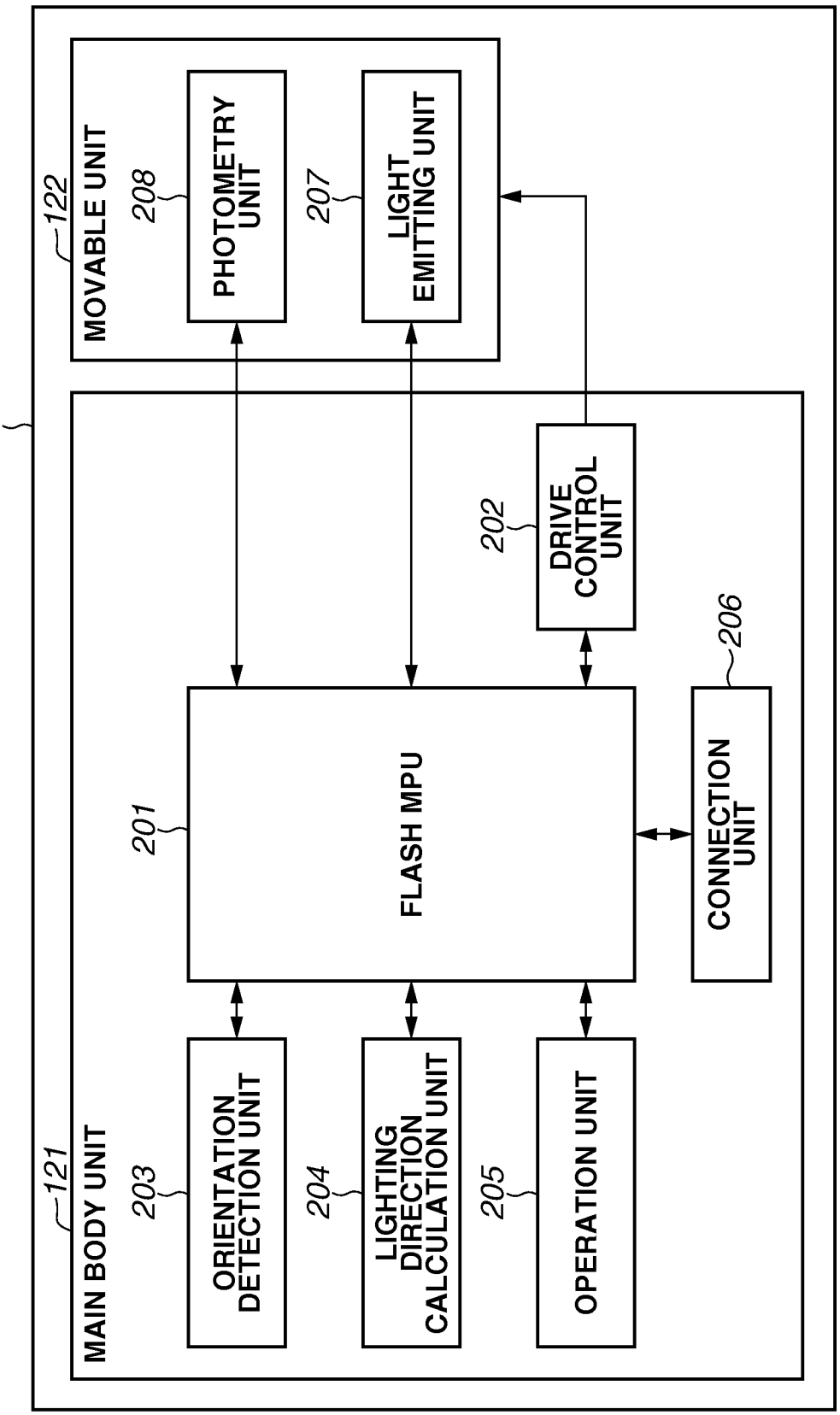
FIG. 2 is a block diagram illustrating a configuration example of an illumination apparatus according to the exemplary embodiment.

Next, a configuration of the external flash 120 that is an illumination apparatus attachable to the imaging apparatus will be described with reference to FIG. 2. FIG. 2 is a block diagram illustrating a configuration example of the external flash 120.

The external flash 120 includes a main body unit 121 to be attached to the camera 100, and a movable unit 122 held to be rotatable in up-down and left-right directions relative to the main body unit 121. A mechanism for holding the movable unit 122 to be rotatable in the up-down and left-right directions relative to the main body unit 121 may be a conventional mechanism. For example, mechanisms discussed in Japanese Patent Application Laid-Open Nos. 63-204238 and 2011-137960 may be used. Therefore, the mechanism for holding the movable unit 122 will not be described in detail.

The main body unit 121 includes a flash MPU 201, a drive control unit 202, an orientation detection unit 203, a lighting direction calculation unit 204, an operation unit 205, and a connection unit 206. The movable unit 122 includes a light emitting unit 207 and a photometry unit 208.

The flash MPU 201 is a microcontroller for controlling operations of the entire external flash 120. The drive control unit 202 drives the movable unit 122 in any of up-down and left-right directions relative to the main body unit 121, by controlling the motor (not illustrated) according to a signal from the flash MPU 201. Further, the drive control unit 202 obtains a drive amount of driving from a reference position of the movable unit 122 relative to the main body unit 121, by using an encoder, and outputs the obtained drive amount to the flash MPU 201. The reference position of the movable unit 122 relative to the main body unit 121 may be, for example, a position where a central axis of the movable unit 122 and an imaging optical axis of the imaging apparatus (the camera 100) do not intersect each other when the external flash 120 is attached to the imaging apparatus, as illustrated in FIG. 5. In the following description, in a state where the imaging optical axis of the camera 100 and the central axis of the movable unit 122 are substantially parallel to each other as illustrated in FIG. 5, a lighting direction of the external flash 120 is a front direction, and a direction opposite to a gravity direction is a ceiling direction. The front direction is parallel with a shooting direction of the camera 100.

The orientation detection unit 203 is configured of components such as an acceleration sensor, and detects orientation of the main body unit 121. The lighting direction calculation unit 204 calculates an optimum lighting direction in the bounce flash shooting, based on information obtained by the orientation detection unit 203, and information obtained by the photometry unit 208 to be described below. Processing for calculating the lighting direction will be described in detail below.

The operation unit 205 includes an automatic bounce switch for switching between execution and non-execution of an automatic bounce. If there is a difference between setting of the automatic bounce switch of the operation unit 117 in the camera 100 and setting of the automatic bounce switch of the operation unit 205 in the external flash 120, priority may be given to either setting. Alternatively, setting of the automatic bounce switch of the operation unit 205 in the external flash 120 and setting of the automatic bounce switch of the operation unit 117 in the camera 100 may be interlocked. In other words, change of setting of one of these automatic bounce switches may automatically change setting of the other.

The connection unit 206 has components including an attachment section for attachment to the imaging apparatus and a contact section provided with a communication contact for communication with the imaging apparatus. The flash MPU 201 performs communication with the imaging apparatus via the contact section of the connection unit 206.

The light emitting unit 207 uses a light source such as a flash tube and a light emitting diode (LED), and includes an optical system that is formed of resin and disposed in front of the light source. The light emitting unit 207 causes the light source to emit light according to a flash signal from the flash MPU 201. The photometry unit 208 includes a photosensor having a light receiving surface facing in the same direction as the lighting direction of the light emitting unit 207. The photometry unit 208 outputs a signal corresponding to a light flux received by the photosensor, to the flash MPU 201. The flash MPU 201 calculates a distance from an emitting plane of the optical system of the light emitting unit 207 to a target, based on a signal output from the photometry unit 208 when receiving a reflected light flux from the target as a result of an emission from the light emitting unit 207. The direction and the position of the photosensor are not limited to the examples described above. For example, the photosensor may be configured to receive a reflected light flux from a target, via a light guiding member such as an optical fiber provided in such a manner that an incidence plane thereof faces in the same direction as the lighting direction of the light emitting unit 207.

Figure 3:
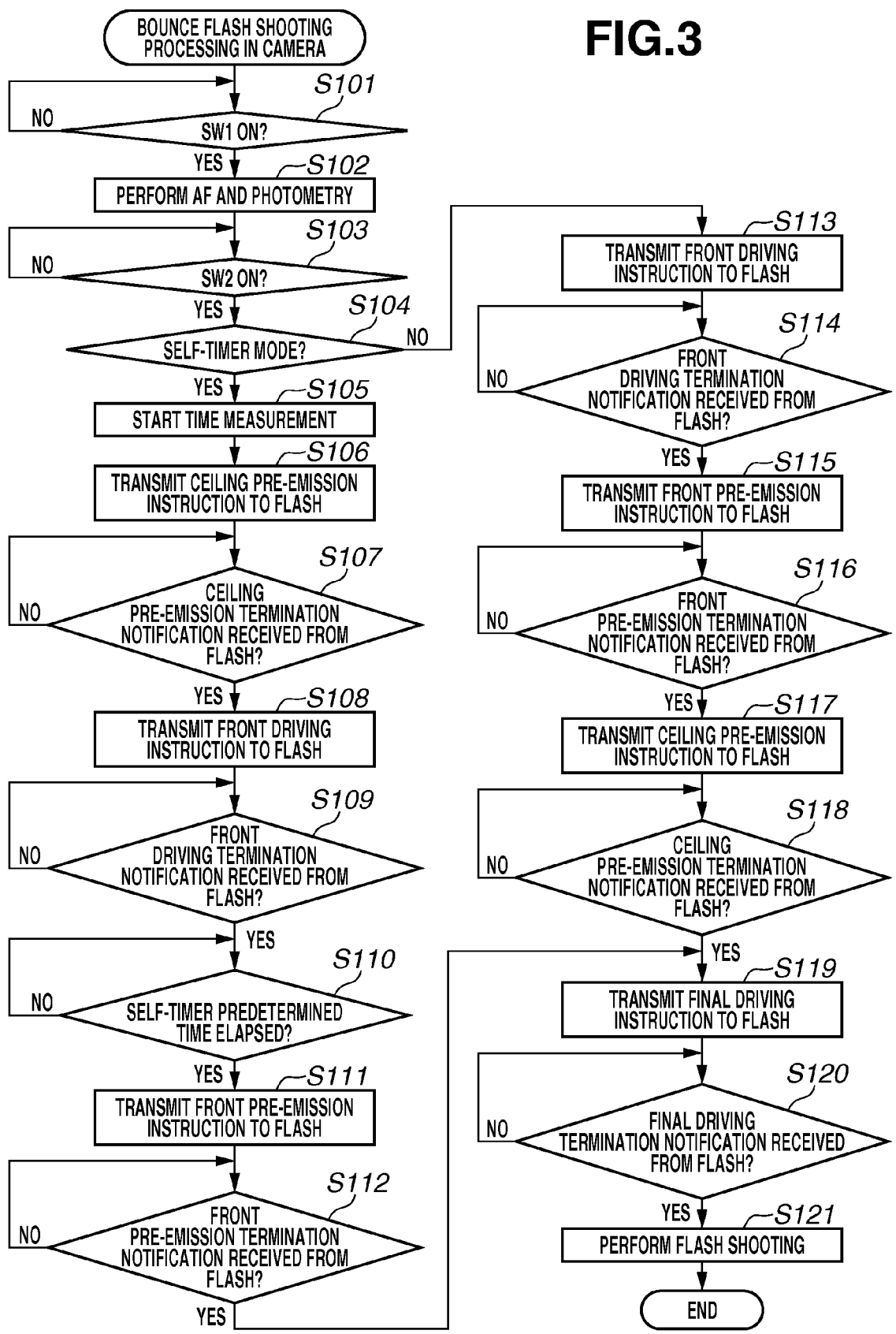
FIG. 3 is a flowchart illustrating various processes in the imaging apparatus in performing bounce flash shooting according to the exemplary embodiment.
Figure 4:
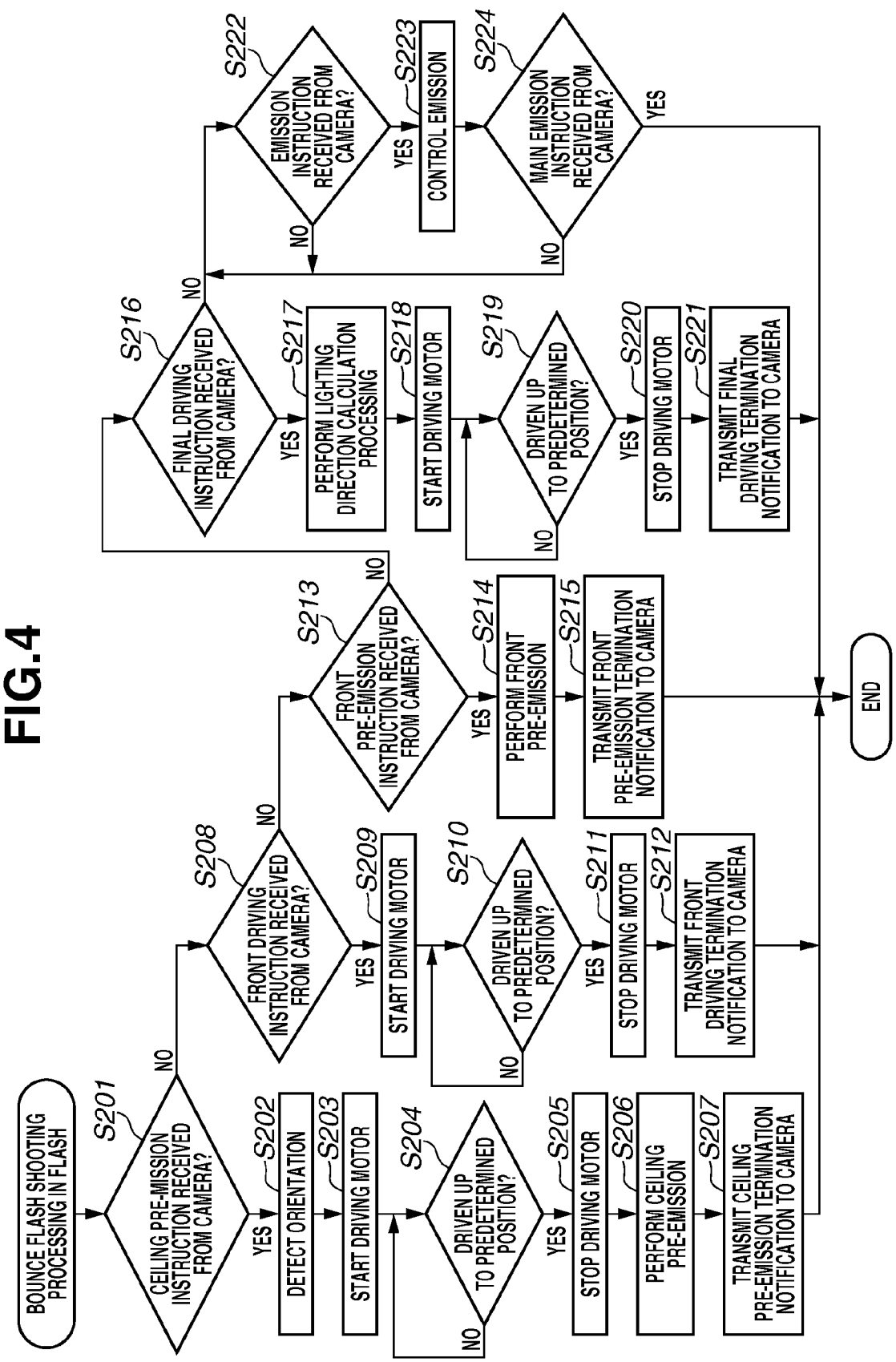
FIG. 4 is a flowchart illustrating various processes in the illumination apparatus in performing bounce flash shooting according to the exemplary embodiment.

Next, various processes in performing the bounce flash shooting by using the camera 100 and the external flash 12 each configured as described above will be described with reference to FIGS. 3 and 4. FIG. 3 is a flowchart illustrating various processes in the camera 100 when the bounce flash shooting is performed. FIG. 4 is a flowchart illustrating various processes in the external flash 120 when the bounce flash shooting is performed.

First, the various processes in the camera 100 will be described with reference to FIG. 3. The operation in the flowchart illustrated in FIG. 3 starts in a state where the camera 100 and the external flash 120 are both turned on, and setting for executing an automatic bounce by using the automatic bounce switch is made.

In step S101, the camera MPU 101 determines whether the switch SW1 is turned on by an operation performed on the operation unit 117. If the camera MPU 101 determines that the switch SW1 is turned on (YES in step S101), the operation proceeds to step S102. On the other hand, if the camera MPU 101 determines that the switch SW1 is OFF (NO in step S101), the operation in step S101 is repeated.

In step S102, the camera MPU 101 instructs the lens control unit 114 to execute a focus adjustment operation (autofocus (AF)). The camera MPU 101 also instructs the photometry unit 112 to execute photometry. Further, the camera MPU 101 performs exposure calculation based on a photometric value obtained from the photometry, and determines exposure control values to be used in shooting.

In step S103, the camera MPU 101 determines whether the switch SW2 is ON as a result of an operation performed on the operation unit 117. If the camera MPU 101 determines that the switch SW2 is ON (YES in step S103), the operation proceeds to step S104. On the other hand, if the camera MPU 101 determines that the switch SW2 is OFF (NO in step S103), the operation in step S103 is repeated.

In step S104, the camera MPU 101 determines whether the self-timer mode is set. If the camera MPU 101 determines that self-timer mode is set (YES in step S104), the operation proceeds to step S105. On the other hand, if the camera MPU 101 determines that the self-timer mode is not set (NO in step S104), the operation proceeds to step S113.

In step S105, the camera MPU 101 starts time measurement by using the timer. In step S106, the camera MPU 101 transmits a ceiling pre-emission instruction to the flash MPU 201, so as to perform a pre-emission while matching the lighting direction of the external flash 120 with the ceiling direction.

In step S107, the camera MPU 101 determines whether a ceiling pre-emission termination notification has been received from the flash MPU 201. The ceiling pre-emission termination notification indicates termination of an operation performed in response to the ceiling pre-emission instruction. If the camera MPU 101 determines that the ceiling pre-emission termination notification has been received (YES in step S107), the operation proceeds to step S108. On the other hand, if the camera MPU 101 determines that the ceiling pre-emission termination notification has not been received (NO in step S107), the operation in step S107 is repeated.

In step S108, the camera MPU 101 transmits a front driving instruction to the flash MPU 201, so as to drive the movable unit 122 to match the lighting direction of the external flash 120 with the front direction.

In step S109, the camera MPU 101 determines whether a front driving termination notification has been received from the flash MPU 201. The front driving termination notification indicates termination of an operation performed in response to the front driving instruction. If the camera MPU 101 determines that the front driving termination notification has been received (YES in step S109), the operation proceeds to step S110. On the other hand, if the camera MPU 101 determines that the front driving termination notification has not been received (NO in step S109), the operation in step S109 is repeated.

In step S110, the camera MPU 101 determines whether a predetermined time corresponding to a waiting time in the self-timer mode has elapsed since the start of the time measurement with the timer. If the camera MPU 101 determines that the predetermined time has elapsed (YES in step S110), the operation proceeds to step S111. On the other hand, if the camera MPU 101 determines that the predetermined time has not elapsed (NO in step S110), the operation in step S110 is repeated.

In step S111, the camera MPU 101 transmits a front pre-emission instruction to the flash MPU 201, so as to perform a pre-emission while matching the lighting direction of the external flash 120 with the front direction.

In step S112, the camera MPU 101 determines whether a front pre-emission termination notification has been received from the flash MPU 201. The front pre-emission termination notification indicates termination of an operation performed in response to the front pre-emission instruction. If the camera MPU 101 determines that the front pre-emission termination notification has been received (YES in step S112), the operation proceeds to step S119. On the other hand, if the camera MPU 101 determines that the front pre-emission termination notification has not been received (NO in step S112), the operation in step S112 is repeated.

On the other hand, if the camera MPU 101 determines that the self-timer mode is not set in step S104 (NO in step S104), the operation proceeds to step S113. In step S113, the camera MPU 101 transmits a front driving instruction to the flash MPU 201.

In step S114, the camera MPU 101 determines whether a front driving termination notification has been received from the flash MPU 201. If the camera MPU 101 determines that the front driving termination notification has been received (YES in step S114), the operation proceeds to step S115. If the camera MPU 101 determines that the front driving termination notification has not been received (NO in step S114), the operation in step S114 is repeated.

In step S115, the camera MPU 101 transmits a front pre-emission instruction to the flash MPU 201. In step S116, the camera MPU 101 determines whether a front pre-emission termination notification has been received from the flash MPU 201. If the camera MPU 101 determines that the front pre-emission termination notification has been received (YES in step S116), the operation proceeds to step S117. On the other hand, if the camera MPU 101 determines that the front pre-emission termination notification has not been received (NO in step S116), the operation in step S116 is repeated.

In step S117, the camera MPU 101 transmits a ceiling pre-emission instruction to the flash MPU 201. In step S118, the camera MPU 101 determines whether a ceiling pre-emission termination notification has been received from the flash MPU 201. If the camera MPU 101 determines that the ceiling pre-emission termination notification has been received (YES in step S118), the operation proceeds to step S119. On the other hand, if the camera MPU 101 determines that the ceiling pre-emission termination notification has not been received (NO in step S118), the operation in step S118 is repeated.

In step S119, the camera MPU 101 transmits a final driving instruction to the flash MPU 201, so as to drive the movable unit 122 to achieve a lighting direction determined in a way to be described below. In step S120, the camera MPU 101 determines whether a final driving termination notification has been received from the flash MPU 201. The final driving termination notification indicates termination of an operation performed in response to the final driving instruction. If the camera MPU 101 determines that the final driving termination notification has been received (YES in step S120), the operation proceeds to step S121. On the other hand, if the camera MPU 101 determines that the final driving termination notification has not been received (NO in step S120), the operation in step S120 is repeated.

In step S121, the camera MPU 101 performs various kinds of control for flash shooting. First, the camera MPU 101 transmits a pre-emission instruction to the flash MPU 201 so as to perform a pre-emission, and obtains a photometric value resulting from the pre-emission released by the external flash 120, from the photometry unit 112. Next, the camera MPU 101 calculates a main emission amount based on the photometric value resulting from the pre-emission, obtained from the photometry unit 112, and transmits a main emission instruction to the flash MPU 201 so as to perform a main emission based on the calculated main emission amount.

The camera MPU 101 performs exposure of the imaging device 102 by using predetermined exposure control values (AV, TV, and ISO) in appropriate timing for the main emission of the external flash 120. Upon completion of the exposure, image data based on an image signal obtained by the imaging device 102 is displayed on the image display unit 107, and recorded in the recording medium 109.

The aforementioned processes are the representative processes in the camera 100 when the bounce flash shooting is performed.

Next, the various processes in the external flash 120 will be described with reference to FIG. 4. The operation in the flowchart illustrated in FIG. 4 starts in a state where the external flash 120 is turned on and setting for execution of an automatic bounce is made by the automatic bounce switch.

In step S201, the flash MPU 201 determines whether a ceiling pre-emission instruction has been received from the camera MPU 101.

If the flash MPU 201 determines that the ceiling pre-emission instruction transmitted in step S106 or step S117 of FIG. 3 has been received (YES in step S201), the operation proceeds to step S202. On the other hand, if the flash MPU 201 determines that the ceiling pre-emission instruction has not been received (NO in step S201), the operation proceeds to step S208.

If the ceiling pre-emission instruction has been received (YES in step S201), then in step S202, the flash MPU 201 obtains orientation information representing orientation of the main body unit 121, from the orientation detection unit 203. Based on this orientation information, the flash MPU 201 detects a tilt of the main body unit 121 relative to the gravity direction.

In step S203, the flash MPU 201 starts driving the movable unit 122 to match the lighting direction with the ceiling direction, by controlling the motor (not illustrated) via the drive control unit 202. The flash MPU 201 calculates a drive amount for matching the lighting direction with the ceiling direction, based on the tilt of the main body unit 121 and the position of the movable unit 122.

In step S204, the flash MPU 201 obtains the current drive amount of the movable unit 122 from the drive control unit 202, thereby determining whether the movable unit 122 has been driven up to a position where the lighting direction is matched with the ceiling direction. If the flash MPU 201 determines that the movable unit 122 has been driven up to that position (YES in step S204), the operation proceeds to step S205. On the other hand, if the flash MPU 201 determines that the movable unit 122 has not been driven up to that position (NO in step S204), the operation in step S204 is repeated.

In step S205, the flash MPU 201 stops driving the movable unit 122, by controlling the motor via the drive control unit 202. The flash MPU 201 controls the position of the movable unit 122, as described with reference to step S203 to step S205. Similar processes are executed in step S209 to step S211, and in step S218 to step S220.

In step S206, the flash MPU 201 causes the light emitting unit 207 to perform a pre-emission in a ceiling direction.

In this process, the flash MPU 201 obtains a photometric value of the pre-emission performed by the light emitting unit 207, from the photometry unit 208. The flash MPU 201 then calculates ceiling distance information indicating a distance to a target in the ceiling direction, based on the obtained photometric value.

In step S207, the flash MPU 201 transmits a ceiling pre-emission termination notification to the camera MPU 101. Then, the operation terminates.

If the flash MPU 201 determines that the ceiling pre-emission instruction has not been received in step S201 (NO in step S201), the operation proceeds to step S208. In step S208, the flash MPU 201 determines whether a front driving instruction has been received from the camera MPU 101.

If the flash MPU 201 determines that the front driving instruction transmitted in step S108 or step S113 of FIG. 3 has been received (YES in step S208), the operation proceeds to step S209. On the other hand, if the flash MPU 201 determines that the front driving instruction has not been received (NO in step S208), the operation proceeds to step S213.

In step S209, the flash MPU 201 starts driving the movable unit 122 to match the lighting direction with the front direction, by controlling the motor (not illustrated) via the drive control unit 202.

In step S210, the flash MPU 201 obtains the current drive amount of the movable unit 122 from the drive control unit 202, thereby determining whether the movable unit 122 has been driven up to a position where the lighting direction is matched with the ceiling direction. If the flash MPU 201 determines that the movable unit 122 has been driven up to that position (YES in step S210), the operation proceeds to step S211. On the other hand, if the flash MPU 201 determines that the movable unit 122 has not been driven up to that position (NO in step S210), the operation in step S210 is repeated.

In step S211, the flash MPU 201 stops driving the movable unit 122, by controlling the motor via the drive control unit 202.

In step S212, the flash MPU 201 transmits a front driving termination notification to the camera MPU 101. Then, the operation terminates.

If the flash MPU 201 determines that the front driving instruction has not been received in step S208 (NO in step S208), the operation proceeds to step S213. In step S213, the flash MPU 201 determines whether a front pre-emission instruction has been received from the camera MPU 101. When the flash MPU 201 determines that the front pre-emission instruction transmitted in step S111 or step S115 of FIG. 3 has been received (YES in step S213), the operation proceeds to step S214. On the other hand, if the flash MPU 201 determines that the front pre-emission instruction has not been received (NO in step S213), the operation proceeds to step S216.

In step S214, the flash MPU 201 causes the light emitting unit 207 to perform a pre-emission in the front direction. Receipt of the front pre-emission instruction from the camera MPU 101 occurs only after receipt of the front driving instruction. Therefore, the flash MPU 201 performs the process in step S214, on the assumption that the lighting direction has been already matched with the front direction.

In this process, the flash MPU 201 obtains a photometric value of the pre-emission released by the light emitting unit 207, from the photometry unit 208. The flash MPU 201 then calculates front distance information indicating a distance to a target in the front direction, based on the obtained photometric value.

In step S215, the flash MPU 201 transmits a front pre-emission termination notification to the camera MPU 101.

If the flash MPU 201 determines that the front driving instruction has not been received in step S213 (NO in step S213), the operation proceeds to step S216. In step S216, the flash MPU 201 determines whether a final driving instruction is received from the camera MPU 101. If the flash MPU 201 determines that the final driving instruction transmitted in step S119 of FIG. 3 has been received (YES in step S216), the operation proceeds to step S217. On the other hand, if the flash MPU 201 determines that the final driving instruction has not been received (NO in step S216), the operation proceeds to step S222.

In step S217, the lighting direction calculation unit 204 determines an optimum lighting direction in the bounce flash shooting by performing calculation, based on the ceiling distance information calculated in step S206 and the front distance information calculated in step S214. A method of calculating the optimum lighting direction is not limited in particular. For example, calculation may be performed to determine a lighting direction aimed at a target in the ceiling direction, the target being located at a distance half the distance to a target in the front direction.

In step S218, the flash MPU 201 starts driving the movable unit 122 to match the lighting direction with the determined optimum direction, by controlling the motor (not illustrated) via the drive control unit 202.

In step S219, the flash MPU 201 obtains the current drive amount of the movable unit 122 from the drive control unit 202, thereby determining whether the movable unit 122 has been driven up to a position where the lighting direction is matched with the optimum direction. If the flash MPU 201 determines that the movable unit 122 has been driven up to that position (YES in step S219), the operation proceeds to step S220. On the other hand, if the flash MPU 201 determines that the movable unit 122 has not been driven up to that position (NO in step S219), the operation in step S219 is repeated.

In step S220, the flash MPU 201 stops driving the movable unit 122, by controlling the motor via the drive control unit 202.

In step S221, the flash MPU 201 transmits a final driving termination notification to the camera MPU 101. Then, the operation terminates.

If the flash MPU 201 determines that the final driving instruction has not been received in step S216 (NO in step S216), the operation proceeds to step S222. In step S222, the flash MPU 201 determines whether an emission instruction has been received from the camera MPU 101. If the flash MPU 201 determines that the pre-emission instruction or the main emission instruction transmitted in step S121 of FIG. 3 has been received (YES in step S222), the operation proceeds to step S223. On the other hand, if the flash MPU 201 determines that either of the pre-emission instruction and the main emission instruction has not been received (NO in step S222), the operation in step S222 is repeated.

In step S223, the flash MPU 201 causes the light emitting unit 207 to emit light in response to the emission instruction that is determined to have been received in step S222. More specifically, when the pre-emission instruction has been received, the flash MPU 201 causes the light emitting unit 207 to perform pre-mission, whereas when the main emission instruction has been received, the flash MPU 201 causes the light emitting unit 207 to perform a main emission.

In step S224, the flash MPU 201 determines whether the emission instruction that is determined to have been received in step S222 is the main emission instruction. If the flash MPU 201 determines that the emission instruction is not the main emission instruction (NO in step S224), the operation returns to step S222, to perform a main emission. If the flash MPU 201 determines that the emission instruction is a main emission instruction (YES in step S224), the operation terminates.

As described above, in the present exemplary embodiment, if the self-timer mode is set, the front distance information is obtained after the predetermined time, which corresponds to the waiting time in the self-timer mode, elapses subsequent to the obtainment of the ceiling distance information. In this way, the distance information of the target in the front direction is obtained in a timing relatively close to a timing of shooting. Therefore, an optimum lighting direction can be accurately calculated, without obtaining the distance information of a subject in a field angle again in response to a change of the subject. In addition, in the self-timer mode, in order to obtain the distance information of the target in the front direction, a pre-emission is performed in a timing relatively close to a timing of shooting, so that the subject can be notified that shooting is about to start. Therefore, motion blurring of the subject can be suppressed.

Further, when the self-timer mode is not set, the ceiling distance information is obtained after the front distance information is obtained. In this way, the movable unit 122 is first driven to match the lighting direction with the front direction, and then driven to match the lighting direction with the ceiling direction. Therefore, the drive amount of the movable unit 122 for the bounce flash shooting can be reduced. This is because an optimum lighting direction to be calculated after obtainment of two kinds of distance information is used for the bounce flash shooting, and this optimum lighting direction is highly likely to be a lighting direction closer to the ceiling direction than to the front direction. Note that there may be a case in which an operation sequence when the self-timer mode is not set is different from the operation sequence of the present exemplary embodiment. Even in such a case, the lighting direction of the illumination apparatus can be automatically determined more efficiently than in a case in which conventional techniques are used, by only executing the operation sequence in the self-timer mode of the present exemplary embodiment.

In the exemplary embodiment described above, in the self-timer mode, the distance information of the target in the ceiling direction is obtained by performing the ceiling pre-emission, and then the distance information of the target in the front direction is obtained by performing the front pre-emission. However, this sequence may be changed depending on the waiting time. For example, a photographer may use the self-timer mode with a relatively short waiting time, considering that a picked-up image may become blurred due to a shock resulting from a press of the release button. In this case, the photographer is unlikely to enter a field angle after pressing down the release button and thus, an operation sequence may be similar to the operation sequence when the self-timer mode is not set. Therefore, the operation sequence for the self-timer mode according to the exemplary embodiment described above may be performed when the waiting time in the self-timer mode is equal to or longer than a threshold (e.g., five seconds or more). On the other hand, the operation sequence may be reversed when this waiting time is shorter than the threshold. For a similar reason, a first mode having a first waiting time and a second mode having a second waiting time, which is shorter than the first waiting time, may each be provided as the self-timer mode, and the operation sequence for the self-timer mode according to the exemplary embodiment described above may be performed only in the first mode.

For calculating each of the distance from the light emitting unit 207 to the subject and the distance from the light emitting unit 207 to the ceiling, a method different from the method described above may be adopted. For example, an infrared emitting unit and an infrared receiving unit may be provided in the lighting direction of the light emitting unit 207, and a distance may be calculated by emitting infrared light toward each of the subject and the ceiling.

For determining the lighting direction optimum for the bounce flash shooting, a method different from the method described above may be adopted. For example, a pre-emission may be performed not only in the front direction and the ceiling direction, but also in each of slightly changed directions. In this method, a lighting direction, which corresponds to a pre-emission resulting in a photometric value optimum for the bounce flash shooting, may be determined as an optimum lighting direction. Alternatively, a pre-emission may be performed in each of slightly changed directions, and a lighting direction, which results in optimum luminance distribution of an image exposed at the imaging device 102 when a pre-emission is performed, may be determined as an optimum lighting direction.

Further, in the exemplary embodiment described above, the lighting direction is determined, by driving the movable unit 122 so that the movable unit 122 faces in the ceiling direction, in the automatic bounce operation. However, the lighting direction may be determined, by driving the movable unit 122 so that the movable unit 122 faces in a direction orthogonal to the ceiling direction. In other words, the movable unit 122 may be driven to face in either the ceiling direction or the direction orthogonal to the ceiling direction, as long as this facing direction is different from the shooting direction of the imaging apparatus.

Furthermore, the camera MPU 101 may perform at least part of the calculation performed by the external flash 120 in determining the lighting direction optimum for the bounce flash shooting. Conversely, the flash MPU 201 may perform at least part of the calculation performed by the camera MPU 101 in determining the lighting direction optimum for the bounce flash shooting. For example, the flash MPU 201 may control performing a pre-emission and driving the movable unit 122 performed when determining a lighting direction optimum for the bounce flash shooting, without receiving an instruction from the camera MPU 101. If the flash MPU 201 receives information indicating that the switch SW2 is turned on, information indicating that the self-timer mode is set, and information indicating a waiting time of the self-timer mode, from the camera MPU 101, similar processes can be executed by the control of the flash MPU 201.

Further, in the exemplary embodiment described above, the various processes for determining the lighting direction optimum for the bounce flash shooting are performed after the switch SW2 is turned on, even when the self-timer mode is not set. However, the various processes for determining the lighting direction optimum for the bounce flash shooting may be performed before, not after, the switch SW2 is turned on, if the self-timer mode is not set. In this case, generation of a time lag from turning on of the switch SW2 to execution of the bounce flash shooting can be suppressed.

Furthermore, in the exemplary embodiment described above, the illumination apparatus having the movable unit rotatable in the up-down and left-right directions relative to the main body unit has been described. However, the illumination apparatus may have a movable unit rotatable only in either of the up-down directions or the left-right directions relative to the main body unit.

In the above-described exemplary embodiment, the external flash 120 performing the auto bouncing operation has been described as an example. However, this example is not seen to be limiting, and aspects of the present invention may be applied to a case where the built-in flash 119 performs an automatic bounce operation. In this case, even if the flash MPU 201 is provided separately from the camera MPU 101, the camera MPU 101 may execute processes executed by the flash MPU 201, without using the flash MPU 201.

The above-described exemplary embodiment is not seen to be limiting, and aspects of the present invention are not limited thereto, and may be variously changed or modified within the scope thereof.

According to the exemplary embodiment, the lighting direction of the illumination apparatus can be efficiently determined, in performing the bounce flash shooting by automatically determining the lighting direction of the illumination apparatus, by using the self-timer function.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-163206, filed Aug. 8, 2014, which is hereby incorporated by reference herein in its entirety.

What is claimed is:

1. An illumination apparatus attachable to an imaging apparatus, the illumination apparatus comprising:
   a light emitting unit;
   a movable unit, including the light emitting unit, configured to be rotatable relative to a main body unit;
   an obtaining unit configured to obtain first distance information about a distance to a target in a shooting direction of the imaging apparatus to which the illumination apparatus is attached, and second distance information about a distance to a target in a direction different from the shooting direction;
   a determination unit configured to determine, based on the first distance information and the second distance information, a lighting direction of the light emitting unit; and
   a control unit configured to control a position of the movable unit to match a lighting direction of the light emitting unit with the lighting direction determined by the determination unit,
   wherein the obtaining unit obtains, in a case where a self-timer mode is set in the imaging apparatus to which the illumination apparatus is attached, the first distance information after a lapse of a predetermined time following obtainment of the second distance information.

2. The illumination apparatus according to claim 1, wherein the predetermined time corresponds to a waiting time in the self-timer mode set in the imaging apparatus to which the illumination apparatus is attached.

3. The illumination apparatus according to claim 1, wherein the obtaining unit obtains, in a case where the self-timer mode is not set in the imaging apparatus to which the illumination apparatus is attached, the second distance information after obtaining the first distance information.

4. The illumination apparatus according to claim 1, wherein the obtaining unit obtains, in a case where a waiting time in the self-timer mode set in the imaging apparatus to which the illumination apparatus is attached is greater than or equal to a threshold, the first distance information after a lapse of the predetermined time following obtainment of the second distance information.

5. The illumination apparatus according to claim 4, wherein the obtaining unit obtains, in a case where the waiting time is shorter than the threshold, the second distance information after obtaining the first distance information.

6. The illumination apparatus according to claim 1, further comprising a photometry unit,
   wherein the obtaining unit obtains the first distance information based on a photometric value obtained by the photometry unit when the light emitting unit is caused to emit light in the shooting direction, and obtains the second distance information based on a photometric value obtained by the photometry unit when the light emitting unit is caused to emit light in the different direction.

7. An illumination apparatus attachable to an imaging apparatus, the illumination apparatus comprising:
   a light emitting unit;
   a movable unit, including the light emitting unit, configured to be rotatable relative to a main body unit;
   an obtaining unit configured to obtain first distance information about a distance to a target in a shooting direction of the imaging apparatus to which the illumination apparatus is attached, and second distance information about a distance to a target in a direction different from the shooting direction;
   a determination unit configured to determine, based on the first distance information and the second distance information, a lighting direction of the light emitting unit; and
   a control unit configured to control a position of the movable unit to match a lighting direction of the light emitting unit with the lighting direction determined by the determination unit,
   wherein the obtaining unit changes, based on whether a self-timer mode is set in the imaging apparatus to which the illumination apparatus is attached an order of obtaining the first distance information and the second distance information.

8. An illumination apparatus attachable to an imaging apparatus, the illumination apparatus comprising:
   a light emitting unit;
   a movable unit, including the light emitting unit, configured to be rotatable relative to a main body unit;
   an obtaining unit configured to obtain first distance information about a distance to a target in a shooting direction of the imaging apparatus to which the illumination apparatus is attached, and second distance information about a distance to a target in a direction different from the shooting direction;

a determination unit configured to determine, based on the first distance information and the second distance information obtained by the obtaining unit, a lighting direction of the light emitting unit; and a control unit configured to control a position of the movable unit to match a lighting direction of the light emitting unit with the lighting direction determined by the determination unit, wherein the obtaining unit changes, based on whether a self-timer mode is set in the imaging apparatus to which the illumination apparatus is attached, whether to obtain the first distance information and the second distance information before or after an instruction for starting a shooting operation is issued to the imaging apparatus.

9. An imaging apparatus comprising:
an imaging device;
a light emitting unit;
a movable unit, including the light emitting unit, configured to be rotatable relative to a main body unit;
an obtaining unit configured to obtain first distance information about a distance to a target in a shooting direction and second distance information about a distance to a target in a direction different from the shooting direction;
a determination unit configured to determine, based on the first distance information and the second distance information obtained by the obtaining unit a lighting direction of the light emitting unit;
a setting unit configured to set a self-timer mode; and
a control unit configured to control a position of the movable unit to match a lighting direction of the light emitting unit with the lighting direction determined by the determination unit,
wherein the obtaining unit obtains, in a case where the self-timer mode is set by the setting unit, the first distance information after a lapse of a predetermined time following obtainment of the second distance information.

10. An imaging apparatus comprising:
an imaging device;
a light emitting unit;
a movable unit, including the light emitting unit, configured to be rotatable relative to a main body unit;
an obtaining unit configured to obtain first distance information about a distance to a target in a shooting direction and second distance information about a distance to a target in a direction different from the shooting direction;
a determination unit configured to determine, based on the first distance information and the second distance information obtained by the obtaining unit, a lighting direction of the light emitting unit;
a setting unit configured to set a self-timer mode; and
a control unit configured to control a position of the movable unit to match a lighting direction of the light emitting unit with the lighting direction determined by the determination unit,
wherein the obtaining unit changes, based on whether the self-timer mode is set by the setting unit, an order of obtaining the first distance information and the second distance information.

11. An imaging apparatus comprising:
an imaging device;
a light emitting unit;
a movable unit, including the light emitting unit, configured to be rotatable relative to a main body unit;
an obtaining unit configured to obtain first distance information about a distance to a target in a shooting direction and second distance information about a distance to a target in a direction different from the shooting direction;
a determination unit configured to, based on the first distance information and the second distance information obtained by the obtaining unit, determine a lighting direction of the light emitting unit;
a setting unit configured to set a self-timer mode;
an operation unit configured to receive an instruction for starting a shooting operation; and
a control unit configured to control a position of the movable unit to match a lighting direction of the light emitting unit with the lighting direction determined by the determination unit,
wherein the obtaining unit changes, based on whether the self-timer mode is set by the setting unit, whether to obtain the first distance information and the second distance information before or after the operation unit receives the instruction for starting the shooting operation.

12. A camera system including an imaging apparatus and an illumination apparatus attached to the imaging apparatus, the camera system comprising:
a light emitting unit;
a movable unit, including the light emitting unit, configured to be rotatable relative to a main body unit;
an obtaining unit configured to obtain first distance information about a distance to a target in a shooting direction and second distance information about a distance to a target in a direction different from the shooting direction;
a determination unit configured to determine, based on the first distance information and the second distance information obtained by the obtaining unit a lighting direction of the light emitting unit;
a setting unit configured to set a self-timer mode in the imaging apparatus; and
a control unit configured to control a position of the movable unit to match a lighting direction of the light emitting unit with the lighting direction determined by the determination unit,
wherein the obtaining unit obtains, in a case where the self-timer mode is set by the setting unit, the first distance information after a lapse of a predetermined time following obtainment of the second distance information.

13. A camera system including an imaging apparatus and an illumination apparatus attached to the imaging apparatus, the camera system comprising:
a light emitting unit;
a movable unit, including the light emitting unit, configured to be rotatable relative to a main body unit;
an obtaining unit configured to obtain first distance information about a distance to a target in a shooting direction and second distance information about a distance to a target in a direction different from the shooting direction;
a determination unit configured to determine, based on the first distance information and the second distance information obtained by the obtaining unit, a lighting direction of the light emitting unit;
a setting unit configured to set a self-timer mode in the imaging apparatus; and a control unit configured to control a position of the movable unit to match a lighting direction of the light emitting unit with the lighting direction determined by the determination unit, wherein the obtaining unit changes, based on whether the self-timer mode is set by the setting unit, an order of obtaining the first distance information and the second distance information.

14. A camera system including an imaging apparatus and an illumination apparatus attached to the imaging apparatus, the camera system comprising:

a light emitting unit;

a movable unit, including the light emitting unit, configured to be rotatable relative to a main body unit;

an obtaining unit configured to obtain first distance information about a distance to a target in a shooting direction and second distance information about a distance to a target in a direction different from the shooting direction;

a determination unit configured to, based on the first distance information and the second distance information obtained by the obtaining unit, determine a lighting direction of the light emitting unit;

a setting unit configured to set a self-timer mode in the imaging apparatus; and a control unit configured to control a position of the movable unit to match a lighting direction of the light emitting unit with the lighting direction determined by the determination unit, wherein the obtaining unit changes, based on whether the self-timer mode is set by the setting unit whether to obtain the first distance information and the second distance information before or after the operation unit receives the instruction for starting the shooting operation.

* * * * *